United States Patent [19]

Premerlani

[11] 4,300,181
[45] Nov. 10, 1981

[54] COMMUTATION CIRCUIT FOR AN HVDC CIRCUIT BREAKER

[75] Inventor: William J. Premerlani, Scotia, N.Y.

[73] Assignee: General Electric Company, Schenectady, N.Y.

[21] Appl. No.: 98,219

[22] Filed: Nov. 28, 1979

[51] Int. Cl.³ .............................................. H02H 3/00
[52] U.S. Cl. .......................................... 361/4; 361/8; 361/13
[58] Field of Search ........................ 361/4, 5, 8, 9, 13

[56] References Cited

U.S. PATENT DOCUMENTS

| | | |
|---|---|---|
| 3,435,288 | 3/1969 | Greenwood . |
| 3,476,978 | 3/1969 | Greenwood . |
| 3,489,918 | 1/1970 | Greenwood . |
| 3,489,950 | 1/1970 | Mishkovsky . |
| 3,489,951 | 1/1970 | Greenwood . |
| 3,737,724 | 6/1973 | Salge . |
| 3,739,192 | 6/1973 | Oswald . |
| 3,753,042 | 8/1973 | Kind et al. . |
| 3,777,178 | 12/1973 | Gratzmuller . |
| 3,781,606 | 12/1973 | Long et al. . |
| 3,786,310 | 1/1974 | Long . |
| 3,809,959 | 5/1974 | Pucher . |
| 3,927,350 | 12/1975 | McConnell . |

OTHER PUBLICATIONS

"Prospects for Multiterminal HVDC Transmission Status of DC Interrupting Devices", G. D. Breuer, 1977.

*Primary Examiner*—J. D. Miller
*Assistant Examiner*—Reinhard J. Eisenzopf
*Attorney, Agent, or Firm*—Charles E. Bruzga; James C. Davis, Jr.; Paul R. Webb, II

[57] ABSTRACT

A commutation circuit for a high voltage DC circuit breaker incorporates a resistor capacitor combination and a charging circuit connected to the main breaker, such that a commutating capacitor is discharged in opposition to the load current to force the current in an arc after breaker opening to zero to facilitate arc interruption. In a particular embodiment, a normally open commutating circuit is connected across the contacts of a main DC circuit breaker to absorb the inductive system energy trapped by breaker opening and to limit recovery voltages to a level tolerable by the commutating circuit components.

20 Claims, 13 Drawing Figures

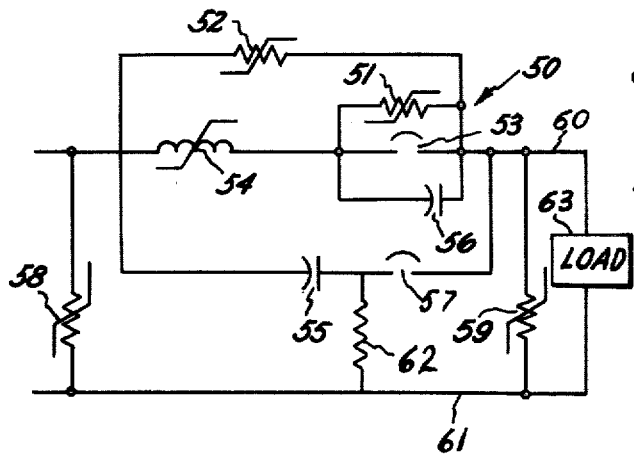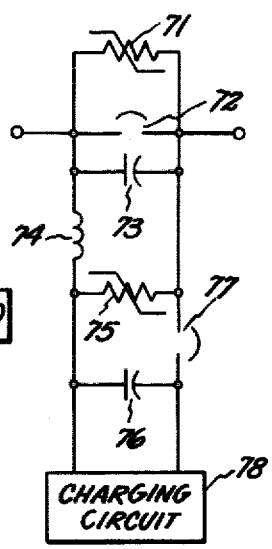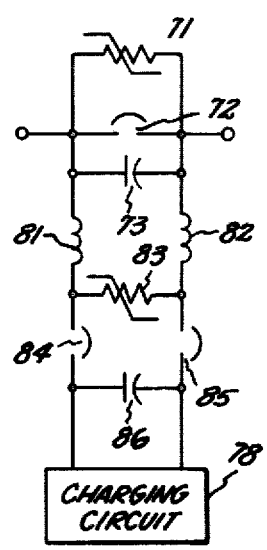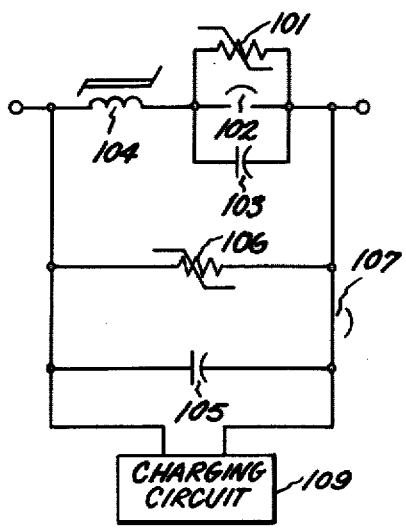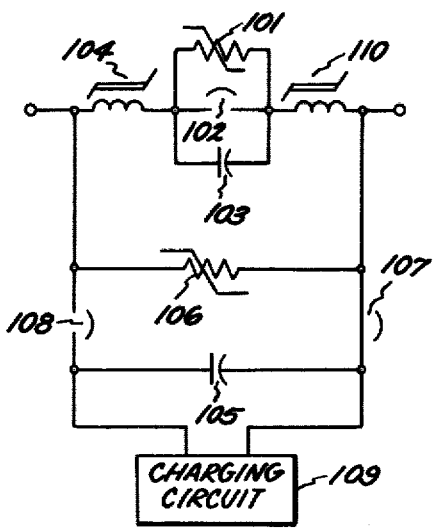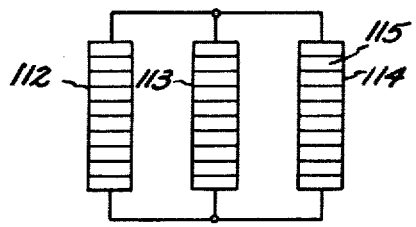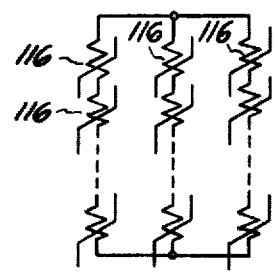

COMMUTATION CIRCUIT FOR AN HVDC CIRCUIT BREAKER

BACKGROUND OF THE INVENTION

The Government of the United States of America has rights in this invention pursuant to Contract No. DE-AC01-76ET2904 awarded by the U.S. Department of Energy.

This invention relates to high voltage direct current (HVDC) circuit interrupting systems, and, more particularly, to such circuit interrupting systems having a commutating circuit attached electrically in parallel with the main circuit breaker to interrupt the arc within the circuit breaker and to limit the voltage peak experienced by the circuit breaker following opening of the contracts.

One prior art approach to energy absorption of a high voltage arc created by opening contacts of an HVDC circuit breaker is presented in U.S. Pat. No. 3,777,178, issued Dec. 4, 1973 to Gratzmuller, which uses a sequenced insertion of resistors to absorb the energy to be dissipated at contact opening. This requires use of a complicated commutation circuit including several resistors having different resistance values, switches to connect the separate resistances to the circuit breaker in a predetermined sequence and sequence control equipment. Further, Gratzmuller uses the switch arc voltage to accomplish commutation, which requires a very large capacitor, thereby, adding substantially to the cost of the commutation circuit.

In U.S. Pat. No. 3,753,042, issued Aug. 14, 1973 to Kind et al. a commutation circuit which charges a commutation capacitor from the arc voltage at contact opening is described. In FIG. 6 of Kind et al. a circuit which employs multiplying the arc voltage is described; however, the circuit configuration illustrated in FIG. 6 has the disadvantageous characteristic that the charging current for the capacitors in C must flow through the charging resistors $R_{L1}-R_{Ln}$. Therefore, the charging resistors must be small enough to charge the capacitors quickly from the arc voltage. However, when the breaker operates the current will flow through the resistors tending to maintain current flow through switches $FS_1-FS_{N+1}$. In this configuration the charging capacitors must be small enough to allow charging of the capacitors in a few milliseconds (e.g., 5 milliseconds) thereby allowing several thousand amps to flow through the resistors after the breaker "interrupts". In an HVDC system such a current is much higher than acceptable for resistors $R_L$, and such small resistors would result in momentary voltage overswings on the capacitors, thereby creating a requirement that the capacitors be very large in order to handle maximum load interruption.

Another prior art technique is that of Greenwood et al., U.S. Pat. No. 3,489,951, issued Jan. 31, 1970. Greenwood et al. describes a system including a surge suppressor connected on the source side of the circuit interrupter to limit voltage excursions in the commutating capacitor to thereby limit the capacitor to a size able to handle the limited voltage which might occur across the capacitor at breaker opening. Such a system requires that the capacitor be able to handle voltages substantially in excess of the system voltage.

SUMMARY OF THE INVENTION

An object of the instant invention is to provide a commutating circuit for an HVDC circuit breaker capable of absorbing the system energy trapped by the breaker opening which employs a minimum size capacitor to drive the interrupter current to zero and nonlinear resistors to absorb the system energy.

Another object of the instant invention is to provide a commutating circuit which limits the peak value of the voltage experienced by the commutating capacitor to a predetermined level.

These objects are accomplished by my invention by providing a commutating circuit in parallel with a circuit breaker in which a nonlinear resistor is connected across the contacts of the main circuit breaker, a snubber capacitor is connected across the contacts of the main circuit breaker, a series combination of a linear commutation reactor and a nonlinear resistor is connected across said main circuit breaker and a series combination of a second precharged capacitor, and an initiation switch is connected across said second nonlinear resistor. Charging means is provided for precharging said commutating capacitor. In one embodiment of the instant invention, saturable reactors are used in place of the linear commutation reactor resistors described above.

BRIEF DESCRIPTION OF THE DRAWINGS

The features of the invention believed to be novel and unobvious over the prior art are set forth with particularity in the appended claims. The invention itself, however, both as to organization and methods of operation, together with further objects and advantages thereof, may best be understood by reference to the following description taken in conjunction with the accompanying drawings in which:

FIG. 7 is a schematic circuit diagram illustrating a preferred embodiment of the commutating circuit of the instant invention;

FIGS. 8 and 9 are schematic circuit diagrams illustrating further embodiments of the instant invention employing nonlinear resistors;

FIGS. 10 and 11 illustrate schematically preferred embodiments of commutating circuits employing saturable reactors;

FIG. 12 is a schematic illustration of a combination of resistor elements making up a nonlinear resistor employed in the instant invention; and FIG. 13 is a schematic circuit diagram of the resistor illustrated in FIG. 12.

DESCRIPTION OF THE PREFERRED EMBODIMENTS

Figure 1:
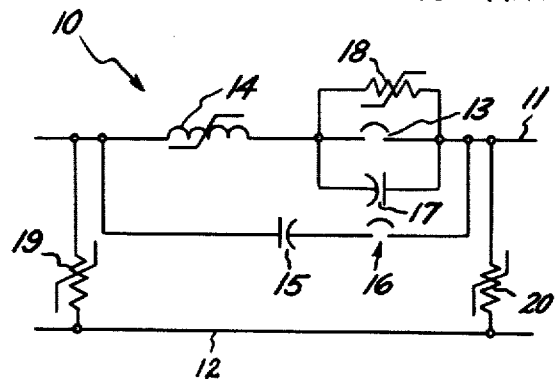
FIG. 1 is a schematic illustration of a circuit breaker employing the commutation principle.

The specific features of the invention described herein and shown in the drawings are merely exemplary, and the scope of the invention is defined in the appended claims. Throughout the description and FIGS. 1-13, like reference characters refer to like elements of the invention.

FIG. 1 illustrates schematically a prior art commutating circuit 10 to assist in interruption in a HVDC system.

The system includes power lines 11 and 12 and main circuit breaker 13 connected in series with a saturable reactor 14 connected in line 11. The reactor 14 could alternatively be a linear reactor. A commutating capacitor 15 connected electrically in series with actuating switch 16 is connected across the combination of circuit breaker 13 and reactor 14. A capacitor 17 and nonlinear resistor 18, respectively, are connected across the contacts of main circuit breaker 13. Lightning arrestors 19 and 20 are connected between lines 11 and 12 to protect the system from sudden current surges due to lightning strikes or other sources.

The commutating circuit of FIG. 1 operates to absorb the energy created by circuit interruption at the time a fault occurs in a DC system which includes lines 11 and 12 and main circuit breaker 13 connected in line 11. The current conducted through breaker 13 and saturable reactor 14 rises until the fault is detected, and breaker 13 is given a command by a control device (not shown) to trip. Breaker 13 opens, but continues to conduct current, as its arc voltage will not be sufficient to reduce the current in the DC circuit. A short time later the precharged capacitor 15 is discharged by the closing of switch 16, which superimposes a high frequency current upon the DC current flowing through breaker 13, thereby creating a current zero and interrupting current flow through the line.

At the instant of current interruption, a voltage of a magnitude dependent upon the magnitude of the current interrupted will be left on capacitor 15, and capacitor 17, initially discharged, will become charged through saturable reactor 14. If the capacitance of capacitor 15 is much larger than that of capacitor 17, capacitor 15 will behave nearly as a voltage source, and saturable reactor 14 and capacitor 17 will interact to produce an oscillating voltage. Since the fault current continues to flow through capacitor 15, it continues to discharge. Therefore, the average value of the voltage across main breaker 13 is seen to change sign and rise steadily as shown by the portion 22 of the voltage waveform in FIG. 3. The per unit recovery voltage scale shown in FIG. 3 references the waveform amplitude to system nominal voltage (e.g., for a 400 KV system, the 1.6 value represents 640 KV). At the point that the voltage appearing across nonlinear resistor 18 exceeds its characteristic value (a value, fixed by its material and configuration) and resistor 18 conducts heavily, appearing essentially as a voltage source. This results in the voltage across main breaker 13 being clamped at the characteristic voltage of the nonlinear resistor, as shown by the portion 23 of the breaker voltage characteristic in FIG. 3.

Figure 5:
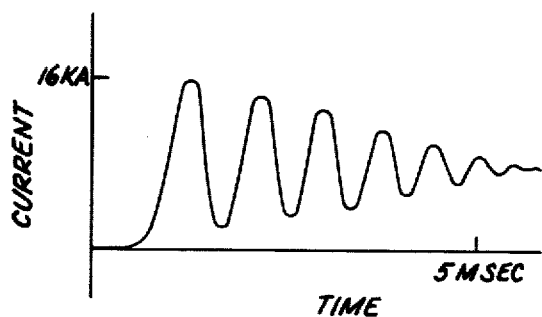
FIG. 5 is a graphical representation of the resistor current in a nonlinear resistor in the configuration of FIG. 1.

The commutating circuit illustrated in FIG. 1 produces a large oscillating current as shown in FIG. 5 superimposed upon the fault current caused by the interaction of capacitor 15 and saturable reactor 14, which produces large current surges through the resistor 18 in addition to producing voltage oscillations which occur at the breaker terminals. Also, depending on the fault current level, the oscillating voltage created by the interaction of capacitor 15 and saturable reactor 14 could produce a peak voltage variation nearly equal to the initial voltage on capacitor 15. This peak voltage variation appears on reactor 14 and, when added to the characteristic voltage of resistor 18, could place as much as 2.6 times the normal system voltage on the system and particularly on capacitor 15 which is not protected from these voltage swings. Such a condition would require that capacitor 15 have a rated voltage $V_R$ large enough to accommodate a voltage of such magnitude without damage. Such a requirement adds substantially to the cost of the commutating circuits, since the size and cost of a capacitor are roughly proportional to the square of the rated voltage. Further, since capacitor life is sharply deteriorated if the rated voltage is exceeded, $V_R$ must be at least equal to the highest voltage expected.

Figure 2:
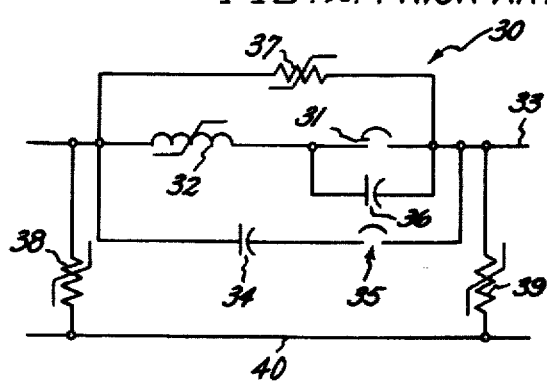
FIG. 2 is an alternate embodiment of a commutating circuit for an HVDC circuit breaker.

FIG. 2 illustrates schematically an alternative prior art commutating circuit 30 for an HVDC system.

The system includes main circuit breaker 31 connected electrically in series with saturable reactor (alternatively a linear reactor) 32 connected in DC power line 33. Commutation capacitor 34 and initiation switch 35 connected electrically in series therewith are connected across the series combination of breaker 31 and reactor 32. A capacitor 36 is connected across the contacts of main breaker 31. A nonlinear resistor 37 is connected across the series combination of breaker 31 and reactor 32. Lightning arrestors 38 and 39 are connected between line 33 and line 40 to protect the system from sudden current surges.

In the circuit 30 electrical current conducted through main circuit breaker 31 and saturable reactor 32 connected in line 33 rises as a fault in the DC system occurs. At some point the fault is detected by a device such as a current level detector (not shown) and breaker 31 is given a command by a control device (not shown) to trip. Breaker 31 opens, but continues to conduct current, as its arc voltage will not be sufficient to reduce the current in the DC circuit. Following opening of main breaker 31 the precharged capacitor 34 is discharged by the closing of switch 35, which superimposes a high frequency current upon the DC current flowing through breaker 31, thereby creating a current zero and interrupting current flow through the line.

Figure 4:
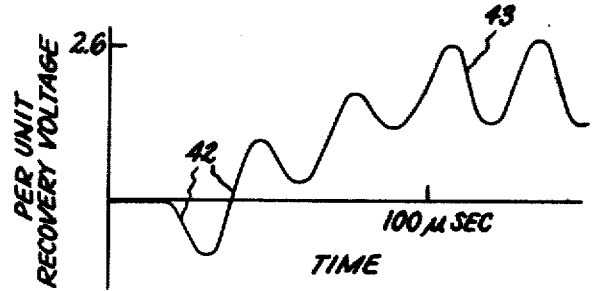
FIG. 4 is a graphical representation of recovery voltage versus time when employing the commutating circuit of FIG. 2.

The voltage appearing across main breaker 31 following contact separation is that shown in per unit scale in FIG. 4. At the instant of current interruption, a voltage of a magnitude dependent upon the magnitude of the current interrupted will be left on capacitor 34, and capacitor 36, initially discharged, will become charged through saturable reactor 32. If the capacitance of capacitor 34 is much larger than that of capacitor 36, capacitor 34 will behave nearly as a voltage source, and saturable reactor 32 and capacitor 36 will interact to produce an oscillating voltage. Since the fault current continues to flow through capacitor 34, it continues to discharge. Therefore, the average value of the voltage across main breaker 31 is seen to change sign and rise steadily as shown by the portion 42 of the voltage waveform in FIG. 4. At the point that the voltage appearing across nonlinear resistor 37 exceeds its characteristic value (a value, fixed by its material and configuration) resistor 37 will conduct heavily, appearing essentially as a voltage source. In the circuit of FIG. 2, the voltage across capacitor 34 is thus clamped at the characteristic voltage of the nonlinear resistor, and saturable reactor 32 and capacitor 36 interact to produce a large oscillating voltage, which appears across main circuit interrupter 31. This oscillating voltage which depends upon the current level interrupted could reach a peak value 2.6 times the system voltage rating as shown at 43 in FIG. 4. Therefore, main interrupter 31 must be designed to be able to withstand a voltage level much in excess of the system rating.

In each of the embodiments shown in FIGS. 1 and 2, the resistors 18, 19, 20 and 37, 38, 39, respectively, must absorb the energy stored in the system inductance, and therefore must be sized thermally to be able to absorb this energy. In an HVDC system, the energy to be absorbed is greater than the energy that a single nonlinear resistor element can handle, and therefore the resistors 18, 19, 30 and 37, 38, 39 are series-parallel connections of several resistor units described below. The current surge compounded with unequal current sharing in parallel elements used to make up resistor 18 or 37, could cause damage to resistor 18 or 37 or to the individual resistor units making up resistor 18 or 37. Therefore, the resistor 18 or 37 will be made as a set of resistors connected to share the load. As the current and voltage environment becomes more severe, i.e., greater voltage and current swings, more resistor units are required to absorb the system energy without damage.

Since in a commutation device the capacitor could experience full system voltage, the voltage rating, $V_R$, must be at least approximately equal to the system voltage during commutation. The commutation current is given by $$I = \frac{V_o}{\sqrt{\frac{L}{C}}} \times \sin(\omega T) \qquad (1)$$

where $$\omega = \sqrt{\frac{1}{LC}},$$

$V_o$ = the initial voltage for precharged capacitors or the arc voltage for arc voltage commutation devices, L = the commutation inductance, and C = the commutation capacitance. Due to the cost considerations described above, the capacitance C of capacitor 15 should be made as small as possible. It would appear from equation (1) that lowering L and C together, maintaining their ratio constant, would be a technique for successfully reducing the size of capacitor. However, it can be seen from the equation $$\omega = \sqrt{\frac{1}{LC}}$$

that doing so will increase the frequency of commutation. The characteristics of switching devices are such that the probability of commutation being successfully achieved rapidly diminishes when a critical frequency, $\omega_C$, is exceeded. The minimum value of capacitance that can be successfully used in a commutating capacitor is given by $$C = \frac{I}{V_o \omega_c} \qquad (2)$$

Therefore, the cost of the capacitor is proportional to $$\frac{1}{\omega_c} \times \frac{V_r^2}{V_o}.$$

As $V_o$ is raised, the cost of the capacitor goes down until $V_o = V_R$. For precharged capacitors, $V_o$ should not be made higher than $V_r$, because to do so would decrease the life of the commutation capacitor. For prior art commutation circuits for a high voltage system (e.g., 400 KV direct current systems) the commutation capacitance required is very large.

The advantages of both the circuits of FIGS. 1 and 2, namely: protection of both the HVDC circuit breaker and the commutation capacitor, are realized by the commutation circuits of my instant invention. In one embodiment of my invention schematically illustrated in FIG. 7, the commutation circuit 50 includes two nonlinear resistors 51, 52 with similar electrical characteristics (i.e., characteristic voltage and resistance values) are connected to main circuit breaker 52 as shown. The characteristic voltage of resistor 51 is chosen to be slightly higher than the characteristic voltage of resistor 52, so that the burden of absorption of system energy is directed to resistor 52, and resistor 51 may be thermally much smaller than resistor 52 for reasons described below. Main circuit breaker 53 could be a plurality of series connected vacuum breakers, or other breaker type suitable for HVDC systems. Nonlinear resistor 51 is connected across the contacts of main breaker 53, and nonlinear resistor 52 is connected across the series connection of main breaker 53 and saturable reactor 54. Reactor 54 could be a linear reactor. Commutating capacitor 55 and initiating switch 57 connected in series therewith are connected across the series connection of main breaker 53 and reactor 54. Snubber capacitor 56 is connected across the contacts of breaker 53. Nonlinear resistors 58, 59 protect the system from sudden voltage surges, but are not a necessary part of commutation circuit 50. As will be clear to those skilled in the art, although the breaker 53, and other elements are described and shown as single circuit elements, these are schematic representations, and a series and/or parallel combination of actual elements selected to meet the particular circuit requirements would be employed in an an actual circuit. Load 63 is diagrammatically shown and is connected to the lines 60, 61, to the right of main breaker 53. (It is to be understood that the further embodiments of the invention shown in FIGS. 8-11 are designed to be operated with loads.)

Figure 3:
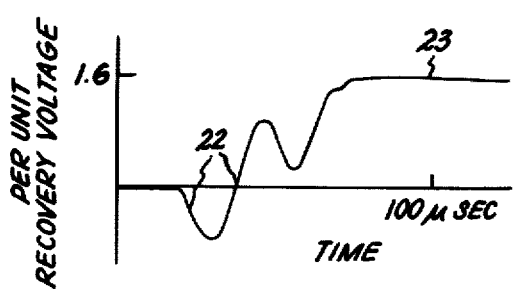
FIG. 3 is a graphical representation of the recovery voltage vs. time for the commutating circuit of FIG. 1.
Figure 6:
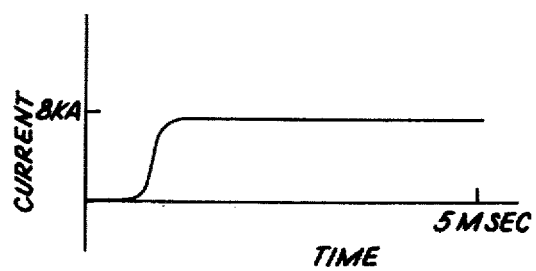
FIG. 6 is a graphical representation of the current flow through the nonlinear resistor in FIG. 2.

The current waveform through resistor 52 following interruption is similar to that shown in FIG. 6, and the voltage waveform across main circuit breaker 53 will be similar to that illustrated in FIG. 3. As shown, nonlinear resistor 51 serves to clip the voltage oscillations appearing across main circuit breaker 53, and nonlinear resistor 52 serves to avoid a current surge through commutation capacitor 55 by limiting voltage oscillations occurring by interaction of saturable reactor 54 and commutating capacitor 55. Furthermore, the connection of resistor 52 as shown in FIG. 7 prevents voltage much greater than the nonlinear resistor characteristic voltage from appearing across the DC system, i.e., saturable reactor 54 and main breaker 53 and commutation capacitor 55.

The commutation circuit illustrated in FIG. 7 operates as follows. Commutation capacitor 55 is charged from the system voltage by the connection to the lines 60, 61 through charging resistor 62. When a fault is detected by monitoring equipment (not shown) the command to open main circuit breaker 53 is received. Breaker 53 is opened causing an arc across its contacts. Switch 57 closes, discharging the precharged capacitor 55 through the main breaker 53, superimposing a high frequency current oscillation on the main breaker current, achieving arc interruption. After interruption, nonlinear resistor 52 limits the voltage appearing across the commutation capacitor 55 and on the HVDC system. Nonlinear resistor 51 serves to clamp main breaker voltage to a value no higher than the characteristic voltage of resistor 51, thereby preventing damage to the main breaker by voltage surges caused by the breaker opening and the application of the commutating current.

By precharging the capacitor to system voltage, the size of the commutation capacitor can be kept to a minimum. The prior art schemes which rely on arc voltage to charge the capacitor require a capacitor much larger than the optimum value, since it is difficult to generate a switch arc voltage of several hundred kilovolts, which is required to match the system DC voltage in order to produce a current zero. Therefore, a precharged commutation capacitor, such as capacitor 55 of FIG. 7 which is precharged by the system voltage, can be of a similar size and yet be capable of generating a voltage equal to the system voltage required, thereby substantially reducing the cost of the commutation capacitor.

The commutating circuit of my invention as shown in FIG. 7 limits the transient voltages that appear across the commutation capacitor 55 and the main breaker 53 based upon the commutation principle. This reduces the required voltage rating of both the commutation capacitor 55 and the main circuit breaker 53, thereby reducing their physical size and cost. Also, by reducing the peak transient voltages, the probability of flashover between connections of the various components of the breaker is reduced, thereby enhancing system reliability. Although the charging capacitor is shown in FIG. 7 to maintain commutation capacitor 55 in the precharged condition, a charging circuit as described below could be employed to maintain precharge level on capacitor 55.

In FIGS. 8 and 9 embodiments of my invention are shown in which a single nonlinear resistor 71 is connected across the contacts of main breaker 72. In the embodiment shown in FIG. 8, a series connection of commutation reactor 74 and a nonlinear energy absorbing resistor 75 are connected across the terminals of main breaker 72. Commutation capacitor 76 and an initiation switch 77 are connected in series and across the terminals of nonlinear energy absorbing resistor 75. A charging circuit 78 of a conventional commercially-available type, such as the model No. BAL-400-100, 400 KV, 100 milliamp DC power supply sold by Universal Voltronics, is placed across the terminals of commutation capacitor 76 to precharge capacitor 76 during normal closed contact operation of main breaker 72. When breaker 72 opens, the resistor 71 limits the voltage which appears across the main breaker contacts to a value approximately equal to the characteristic voltage of nonlinear resistor 71. Switch 77 is closed to superimpose an AC current from precharged commutation capacitor 76 upon the DC current appearing across the contacts of main breaker 72. Resistor 75 limits the voltage appearing across commutation capacitor 76 to a value approximately equal to the characteristic voltage of nonlinear resistor 75 and absorbs the energy remaining in the system at the time of breaker opening. The voltage requirement of commutation capacitor 76 is thereby limited to about 1.6 times system voltage. In this way, the two nonlinear resistors 71 and 75 aid in limiting voltage requirements of main breaker 72 and commutation capacitor 55, respectively, and therefore the capacitance of commutating capacitor 76 to a level significantly below that employed in the prior art.

In FIG. 9 is shown a circuit similar to that of FIG. 8, but which includes two commutation reactors 81, 82 in series with energy absorbing resistor 83 connected across snubber capacitor 73 and a pair of initiation switches 84, 85 in series with commutation capacitor 86, and charging circuit 78 connected across commutation capacitor 86. This arrangement provides a separate isolation switch 84 to facilitate charging of commutation capacitor 86 to allow the charging circuit 78 to be normally near ground potential, which reduces the voltage stress on its supporting structure and its step up transformer.

FIGS. 10 and 11 illustrate alternative preferred embodiments of the instant invention employing saturable reactors in place of linear reactors as described with respect to FIGS. 8 and 9 above. Saturable reactors produce a short time duration pause in the current waveform following breaker opening. In each of FIGS. 10 and 11, a nonlinear resistor 101 is connected across main breaker 102 to limit the main breaker voltage to the characteristic voltage of nonlinear resistor 101 and a capacitor 103 is connected across breaker 102 to limit the rate of rise of recovery voltage following interruption. Saturable reactor 104 connected in series with main breaker 102 must carry the steady state current of the breaker and together with commutation capacitor 105 produces the oscillating commutation current. In both configurations of FIGS. 10 and 11 nonlinear resistor 106 forces the voltage on capacitor 105 to remain below a predetermined multiple, e.g., 1.6, of the system voltage, and nonlinear resistors 101, 106 limit the breaker voltage and dissipate the energy which must be absorbed after breaker opening. The circuit in FIG. 10 includes initiation switch 107 to cause commutation to occur, and the circuit in FIG. 11 further includes isolation switch 108 to isolate charging circuit 109, so that charging circuit 109 is normally near ground potential, which reduces the voltage stress on its supporting structure and its step up transformer. FIG. 11 also shows a second saturable reactor 110 connected in series with breaker 102 which upon breaker opening interacts with commutation capacitor 105 and reactor 104 to produce the commutation current.

Since in an HVDC system the energy which must be absorbed exceeds the absorption capability of most resistors, a series parallel resistor assembly as shown schematically in FIG. 12 would be employed as the energy absorbing and voltage suppressing nonlinear resistors. Each such resistor assembly comprises a plurality of stacks 112, 113 and 114 of series connected resistor disc elements 115 connected in parallel. When attached in any of the commutation circuits of FIGS. 7-11, the resistors 112, 113 and 114 share the energy absorption demand and prevent damage from occurring to any of the resistors 112, 113 and 114 or any individual resistor element 115. The number of elements 115 used in each resistor and the number of resistors in each assembly can be selected to meet the duty requirements of the particular system being protected. FIG. 13 shows the equivalent circuit for the resistor assembly. Each element 115 is represented by a resistor 116, and the total assembly resistance can be readily adjusted to accommodate whatever load demand is anticipated for a particular system.

In a particular preferred embodiment surge arrestors sold under the registered Trademark Tranquell ® are used, in which each resistor element in a resistor assembly is a zinc-oxide resistor element of the type sold under the trademark Zenox by the General Electric Company. These resistor assemblies are preferred because of their highly nonlinear characteristics.

A particular embodiment of my invention for a 400 KV DC system employs an assembly of the type illustrated in FIG. 9. Since a maximum voltage expected to appear on the system at breaker opening is approximately 1.6 times rated voltage, a series connected combination of 8 vacuum interrupters rated at 80 KV each and having a 10,000 amp interrupting capability is connected in an HVDC power line. A snubber capacitor of 1000 pF and also rated 640 KV is connected in parallel with the interrupter. A Tranquell surge suppressor consisting of three parallel resistors, each having 128 5 KV Zenox resistor elements connected in series, is used as the voltage suppression nonlinear resistor connected across the contacts of the breaker, and as the energy absorbing nonlinear resistor connected across the commutation capacitor which is a 1.4 μF 640 KV rated capacitor. The commutating reactors are each 0.5 mH saturable reactors, and the charging circuit was a Universal Voltronics No. BAL-400-100 type power supply. This system is capable of responding under fault conditions to eliminate the arc and complete circuit interruption in the desired time of 5 msec.

As will be clear to those of ordinary skill in the art, my instant invention provides a system for absorbing the energy created by opening of a high voltage DC circuit breaker without requiring very large capacitors in order to be capable of handling voltages substantially greater than the main breaker system voltage.

I claim:

1. An interrupter for interrupting a high voltage direct-current circuit which comprises a DC source having a pair of terminals, first and second electrical conductors, respectively, connected to said terminals, and a load connected across said conductors, comprising:
   a main circuit breaker connected in said first electrical conductor in series with said load and between a first one of said terminals and said load; and
   a normally-open commutating circuit connected across said main circuit breaker comprising:
      means for suppressing voltage surges connected across said main circuit breaker;
      a snubber capacitor connected across said main circuit breaker;
      a series combination including a commutation reactor and means for absorbing energy connected across said snubber capacitor;
      a series combination including a commutation capacitor and an initiation switch connected across said means for absorbing energy; and
      means for charging said commutation capacitor connected and maintaining said commutation capacitor precharged during normal closed contact operation of said main breaker.

2. The apparatus of claim 1 wherein said means for charging said commutation capacitor comprises a charging resistor connected to said commutation capacitor and to the second of said electrical conductors.

3. The apparatus of claim 1 wherein said means for suppressing voltage surges comprises a first nonlinear resistor, and said means for absorbing energy comprises a second nonlinear resistor.

4. The apparatus of claim 3 wherein said means for charging said commutation capacitor comprises a direct current high voltage power supply.

5. The apparatus of claim 4 further comprising an initiation switch which is open during normal closed operation of the main circuit breaker.

6. The apparatus of claim 5 wherein said DC source comprises a 400 KV source, and said snubber capacitor and said commutation capacitor each have a 640 KV rating.

7. A commutation circuit for a high voltage direct current circuit, wherein said high voltage direct current circuit comprises a DC source having a pair of terminals, first and second electrical conductors, respectively, connected to said terminals and a load connected across said conductors, and a main circuit breaker connected in said first conductor in series with said load and between a first one of said terminals and said load; said commutation circuit comprising:
   a first commutation reactor connected in series with said main circuit breaker;
   a snubber capacitor connected across said main circuit breaker;
   means for suppressing voltage surges connected across said main circuit breaker;
   means for absorbing energy of the circuit at main breaker opening connected across the series combination of said main circuit breaker and said commutation reactor;
   a series combination of an initiation switch and a commutation capacitor connected across said series combination of said main circuit breaker and said commutation reactor; and
   means to precharge said commutation capacitor from the circuit voltage.

8. The apparatus of claim 7 wherein said main circuit breaker comprises a vacuum interrupter.

9. The apparatus of claim 8 wherein said means for suppressing voltage surges comprises a first nonlinear resistor, and said means for absorbing energy comprises a second nonlinear resistor.

10. The apparatus of claim 9 wherein said first and said second nonlinear resistors each comprises a lightning arrestor comprising series parallel connections of zinc-oxide resistor elements.

11. The apparatus of claim 10 wherein said DC source comprises a 400 KV source, said snubber capacitor comprises a capacitor having a capacitance of from 100 to 1000 picofarads and having a 640 KV voltage rating, and said commutation capacitor comprises a capacitor having a capacitance of from 1.0 to 15.0 microfarads and having a 640 KV rating.

12. An interrupter for interrupting a high voltage direct current circuit which comprises a DC source having a pair of terminals, first and second electrical conductors, respectively, connected to said terminals, and a load connected across said conductors, comprising:

a series combination of a main circuit breaker and a commutation reactor connected in one of said electrical conductors;

a snubber capacitor connected across said main circuit breaker;

means for suppressing voltage surges connected across said main circuit breaker;

means for absorbing energy of the circuit at main breaker opening connected across the series combination of said main circuit breaker and said commutation reactor;

a series combination of an initiation switch and a commutation capacitor connected across said series combination of said means for absorbing energy; and means for charging said commutation capacitor.

13. The apparatus of claim 12 wherein said main circuit breaker comprises a vacuum interrupter.

14. The apparatus of claim 13 wherein said means for suppressing voltage surges comprises a first nonlinear resistor, and said means for absorbing energy comprises a second nonlinear resistor.

15. The apparatus of claim 14 wherein said first and said second nonlinear resistors each comprises a lightning arrestor comprising series-parallel connections of zinc-oxide resistor elements.

16. The apparatus of claim 15 wherein said DC source comprises a 400 KV source, said snubber capacitor comprises a capacitor having a capacitance of from 100 to 1000 picofarads and having a 640 KV voltage rating, and said commutation capacitor comprises a capacitor having a capacitance of from 1.0 to 15.0 microfarads and having a 640 KV rating.

17. The apparatus of claim 16 wherein said means for charging said commutation capacitor comprises a direct current high voltage power supply.

18. The apparatus of claim 17 wherein said DC source comprises a 400 KV source, and said snubber capacitor and said commutation capacitor each have a 640 KV rating.

19. A method of high voltage direct current circuit interruption comprising the steps of:

precharging a commutation capacitor connected to a main DC circuit breaker connected in a high voltage DC circuit;

opening the contacts of said main DC circuit breaker;

blocking voltage surges across said breaker;

blocking voltage surges across said commutation capacitor;

superimposing a commutation current on the current of said breaker by discharging said commutation capacitor; and absorbing the energy of the circuit being interrupted.

20. The method of claim 19 wherein said step of precharging said commutation capacitor comprises charging said commutation capacitor from a DC source separate from said high voltage direct current circuit; and said step of superimposing a commutation current on the current of said breaker comprises closing a normally open switch connecting said commutation capacitor to said main circuit breaker.

* * * * *